(12) United States Patent
Scholz et al.

(10) Patent No.: US 12,547,839 B2
(45) Date of Patent: Feb. 10, 2026

(54) METHOD FOR ANALYZING DATA INCLUDING A LARGE NUMBER OF INDIVIDUAL MESSAGES, COMPUTER PROGRAM PRODUCT, AND COMPUTER SYSTEM

(71) Applicant: Siemens Aktiengesellschaft, Munich (DE)

(72) Inventors: André Scholz, Deining (DE); Vladimir Lavrik, Dreieich (DE)

(73) Assignee: Siemens Aktiengesellschaft, Munich (DE)

( * ) Notice: Subject to any disclaimer, the term of this patent is extended or adjusted under 35 U.S.C. 154(b) by 168 days.

(21) Appl. No.: 18/569,490

(22) PCT Filed: May 11, 2022

(86) PCT No.: PCT/EP2022/062851
§ 371 (c)(1),
(2) Date: Dec. 12, 2023

(87) PCT Pub. No.: WO2022/263069
PCT Pub. Date: Dec. 22, 2022

(65) Prior Publication Data
US 2024/0265208 A1 Aug. 8, 2024

(30) Foreign Application Priority Data
Jun. 15, 2021 (EP) .................................. 21179583

(51) Int. Cl.
*G06F 40/20* (2020.01)
*G05B 23/02* (2006.01)
*G06F 40/30* (2020.01)

(52) U.S. Cl.
CPC ......... *G06F 40/30* (2020.01); *G05B 23/0272* (2013.01)

(58) Field of Classification Search
CPC ........................... G06F 40/30; G05B 23/0272
See application file for complete search history.

(56) References Cited

U.S. PATENT DOCUMENTS

| 2011/0185234 | A1 | 7/2011 | Cohen |
| 2019/0065576 | A1 | 2/2019 | Peng |
| 2021/0056071 | A1* | 2/2021 | Fradkin ............... G06F 16/1794 |

FOREIGN PATENT DOCUMENTS

WO        2017051425  A1     3/2017

OTHER PUBLICATIONS

PCT International Preliminary Report on Patentability mailed Jul. 26, 2023 corresponding to PCT International Application No. PCT/EP2022/062851, pp. 1-7.

(Continued)

*Primary Examiner* — Mahelet Shiberou
(74) *Attorney, Agent, or Firm* — Lempia Summerfield Katz LLC

(57) ABSTRACT

In order to be able to confidently interpret log files of various system domains, experts need to undergo extensive training. Knowledge about one system does not necessarily transfer to other systems. Domain experts manually inspect log files, trying to find anomalies and concerning events. In some cases, domain experts may be assisted by log monitoring tools that match hand-crafted regular expressions against log entries or are use regular expressions to cluster log entries into groups. The proposed method advantageously identifies sequence patterns from semi-structured text log messages and classifying the identified patterns (e.g., blocks or a portion of a block) into categories (e.g., error, warning, and info). The identified patterns represent higher-level events that happen in the industrial plant (e.g., a plant-wide update process) and important sections may be automatically highlighted in a log file to human reviewers/domain experts.

10 Claims, 4 Drawing Sheets

(56) References Cited

OTHER PUBLICATIONS

Faruqui, Manaal et al., "Problems With Evaluation of Word Embeddings Using Word Similarity Tasks," The First Workshop on Evaluating Vector Space Representations for NLP, 2016, pp. 1-6.

Vijaymeena, M.K. et al., "A Survey on Similarity Measures in Text Mining," Machine Learning and Applications: An International Journal (MLAIJ) vol. 3, No. 1, Mar. 2016, pp. 1-10.

* cited by examiner

FIG 2
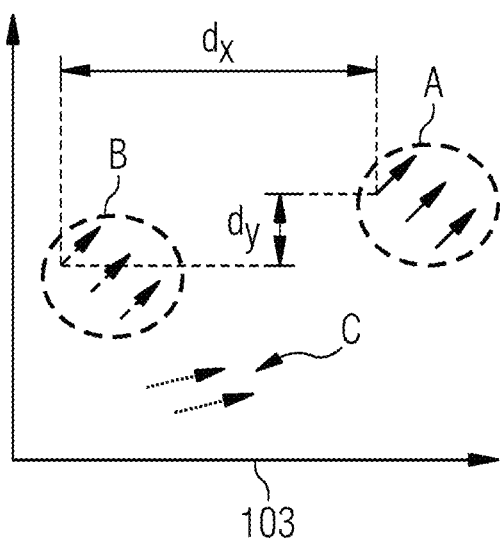
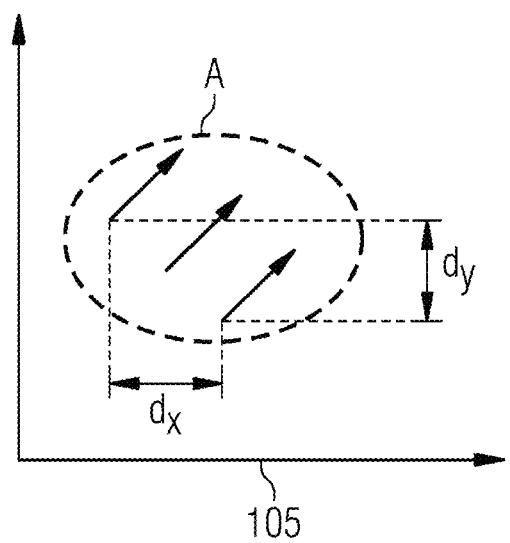

METHOD FOR ANALYZING DATA INCLUDING A LARGE NUMBER OF INDIVIDUAL MESSAGES, COMPUTER PROGRAM PRODUCT, AND COMPUTER SYSTEM

The present patent document is a § 371 nationalization of PCT Application Serial No. PCT/EP2022/062851, filed May 11, 2022, designating the United States, and this patent document also claims the benefit of European Patent Application No. 21179583.6, filed Jun. 15, 2021, which are incorporated by reference in their entireties.

TECHNICAL FIELD

The present disclosure relates to analyzing log files of an industrial plant. Particularly, the present disclosure relates to automatic and/or semi-automatic methods of analyzing the log files.

BACKGROUND

In computing, a log file is a file that records either events that occur in an operating system or other software runs, or messages between different users of a communication software.

Logging may refer to the act of keeping a log, e.g., saving events that occur in a system or other software runs, or messages between different instances of the system. In one example, messages are written to a single log file.

A transaction log may be a file of the communications between a system and the users of that system, or a data collection method that automatically captures the type, content, or time of transactions made by a person from a terminal with that system.

Many operating systems, software frameworks, and programs include a logging system. A widely used logging standard may be syslog, defined in Internet Engineering Task Force (IETF) RFC 5424. The syslog standard enables a dedicated, standardized subsystem to generate, filter, record, and analyze log messages.

The data contained in such log files may be organized as so called semi-structured data. This is a form of structured data that may contain tags or other markers to separate semantic elements and enforce hierarchies of records and fields within the data.

Semi-structured data, is a form of structured data that does not obey the tabular structure of data models associated with for example, relational databases or other forms of data tables but nonetheless contains tags or other markers to separate semantic elements and enforce hierarchies of records and fields within the data. The entities belonging to the same class may have different attributes even though they are grouped together, and the attributes' order is not important.

Semi-structured data are increasingly occurring because the advent of the Internet where different applications need a medium for exchanging information.

In industrial environments, for example, a lot of useful information is recorded in log files. Events that happen in operating, automation, and engineering systems, as well as applications running on these systems, all of the events are written into log files. Thus, log files provide an audit trail, meaning a chronological record, set of records, and/or destination and source of records that provide documentary evidence of the sequence of activities that have affected at any time a specific operation, procedure, or event, that may be used to understand the activity of the system and to diagnose problems. They are essential for understanding the activities of complex systems, particularly in the case of applications with little user interaction (such as server applications).

As used herein, "industrial plant" refers to a facility for manufacture, production, or sorting that may be semi-automated or completely automated. The industrial plant may be part of an automation environment, (e.g., manufacturing automation environment, laboratory automation environment, building automation environment, and the like). Further, according to the present disclosure, an industrial plant may include a combination of industrial assets such as control devices, sensors, or actuators that include a physical device and a digital model that may be used to configure and control the physical device, (e.g., Computer Numerical Control (CNC) machines, automation systems in an industrial production facility, motors, generators, and the like).

Large networks and complex industrial systems may generate large amounts of log data per day. This makes a manual review of log files infeasible. Moreover, the generated log messages address system level events and do not directly transfer to problems in the higher-level system, such as an entire plant. For example, ten lines of log messages may all relate to one update process being performed. In industrial systems, these challenges are reinforced by the large number of different subsystems that are all logging their own information.

In order to be able to confidently interpret log files of these various systems, domain experts need to undergo extensive training. Knowledge about one system does not necessarily transfer to other systems (e.g., Windows logs get interpreted in a different way than WinCC logs). Similarly, it is time consuming and costly to build up knowledge bases with rules on how to interpret individual log messages.

Domain experts manually inspect log files, trying to find anomalies and concerning events. In some cases, domain experts may be assisted by log monitoring tools that match hand-crafted regular expressions against log entries or are use regular expressions to cluster log entries into groups. Such regular expressions may be manually shortlisted, making the formulation effortful, time consuming, and not scalable across different types of log files. Other existing approaches include tools that detect patterns on log message-level. However, these methods do not consider complex patterns and hierarchical dependencies between log entries.

In U.S. Patent Application Publication No. 2011/0185234, an automated method of processing computer system event logs is proposed that determines message clusters by identifying template text in the log message. Those clusters may coincide with particular kinds of system behavior.

Accordingly, the systems, devices, and methods for analyzing log files of an industrial plant may benefit from improvements.

SUMMARY AND DESCRIPTION

The scope of the present disclosure is defined solely by the appended claims and is not affected to any degree by the statements within this summary. The present embodiments may obviate one or more of the drawbacks or limitations in the related art.

The object of the present disclosure is achieved by providing a method, a computer program product, and a device to automatically interpret large amounts of log files and identify events in the industrial plant or overarching system.

For analyzing data including a large number or plurality of individual messages stored in a file in a semi-structured way, the method includes: retrieving the individual messages from the file and storing it in a text corpus in a structured way; transforming the text corpus into a vector space representation; calculating a cosine similarity between the individual messages in a vector space; and based on a calculation of Euclidean distance between similar vectors to a first clustering, clustering the individual messages, which have nearly the same cosine similarity, with a threshold of 0.7, but different Euclidian distance, in order to determine a log message template.

A method is disclosed for finding templates of messages from semi-structured text sources, like computer log messages, meaning a unique non-executable file format intended specifically for that particular application.

Additionally, a computer program product and a computer device are disclosed herein.

The proposed method advantageously identifies sequence patterns from semi-structured text log messages and classifying the identified patterns (e.g., blocks or a portion of a block) into categories such as, error, warning, and info. The identified patterns represent higher-level events that happen in the industrial plant (such as a plant-wide update process) and important sections may be automatically highlighted in a log file to human reviewers/domain experts.

Another advantageous embodiment includes the automatic generation of a knowledge base of events and their severity and automatically detecting anomalies in the log files. For example, the present disclosure enables effective and automatic detection of an anomalous communication pattern between Servers and Clients of the industrial plant by analyzing the log entries. The present disclosure also enables comparison of operations across industrial plants within the same industry. For example, detection of atypical behavior in multiple devices of a specific industrial plant by comparison with devices from a comparable industrial plant may be enabled by through log file analysis of both industrial plants.

Until now, standard approaches using Natural Language Processing (NLP) techniques for text analysis are used to create templates out of semi-structured text sources, like computer log messages. There are some specifics, however, to mention in the field of computer log messages.

The used vocabulary is very small and domain specific in comparison to "normal" text sources, for example, newspapers or web pages. Therefore, two messages containing nearly the same words, but in another sequence may have a totally different meaning. For example, "Windows started new update" vs. "Update started in new Window".

Classically used NLP techniques, like "bag-of-words" approaches, may lead to wrong results, because most of them do not care about the sequence of words within a text (problems of calculating word vectors are described in Faruqui, Tsvetkov, et al.: "Problems With Evaluation of Word Embeddings Using Word Similarity Tasks", The First Workshop on Evaluating Vector Space Representations for NLP, 2016).

In direct comparison to other existing approaches, a combination of different calculation methods is used (described in Vijaymeena, Kaitha: "A Survey on Similarity Measures in Text Mining", Machine Learning and Applications: An International Journal (MLAIJ) Vol. 3, No. 1, March 2016) and applied on the log messages with their reduced set of vocabulary. Only one calculation method is used to calculate similarity between text documents or sentences.

BRIEF DESCRIPTION OF THE DRAWINGS

Below, the disclosure is described using the embodiments illustrated in the figures:

FIG. 2 depicts a view of details of the method.

DETAILED DESCRIPTION

Cosine similarity is a metric used to determine how similar two entities are irrespective of their size. Mathematically, it measures the cosine of the angle between two vectors projected in a multi-dimensional space. (See, e.g., https://en.wikipedia.org/wiki/Cosine_similarity)

In the field of natural language processing (NLP), the similarity among features is quite intuitive. Features such as words, n-grams, (meaning a contiguous sequence of n items from a given sample of text), or syntactic n-grams may be quite similar, though formally they are considered as different features in the Vector Space Model (VSM).

For example, words "play" and "game" are different words and thus mapped to different points in the VSM; yet they are semantically related.

For calculating soft cosine, a matrix is used to indicate similarity between features. It may be calculated through Levenshtein distance, WordNet similarity, or other similarity measures.

Figure 1:
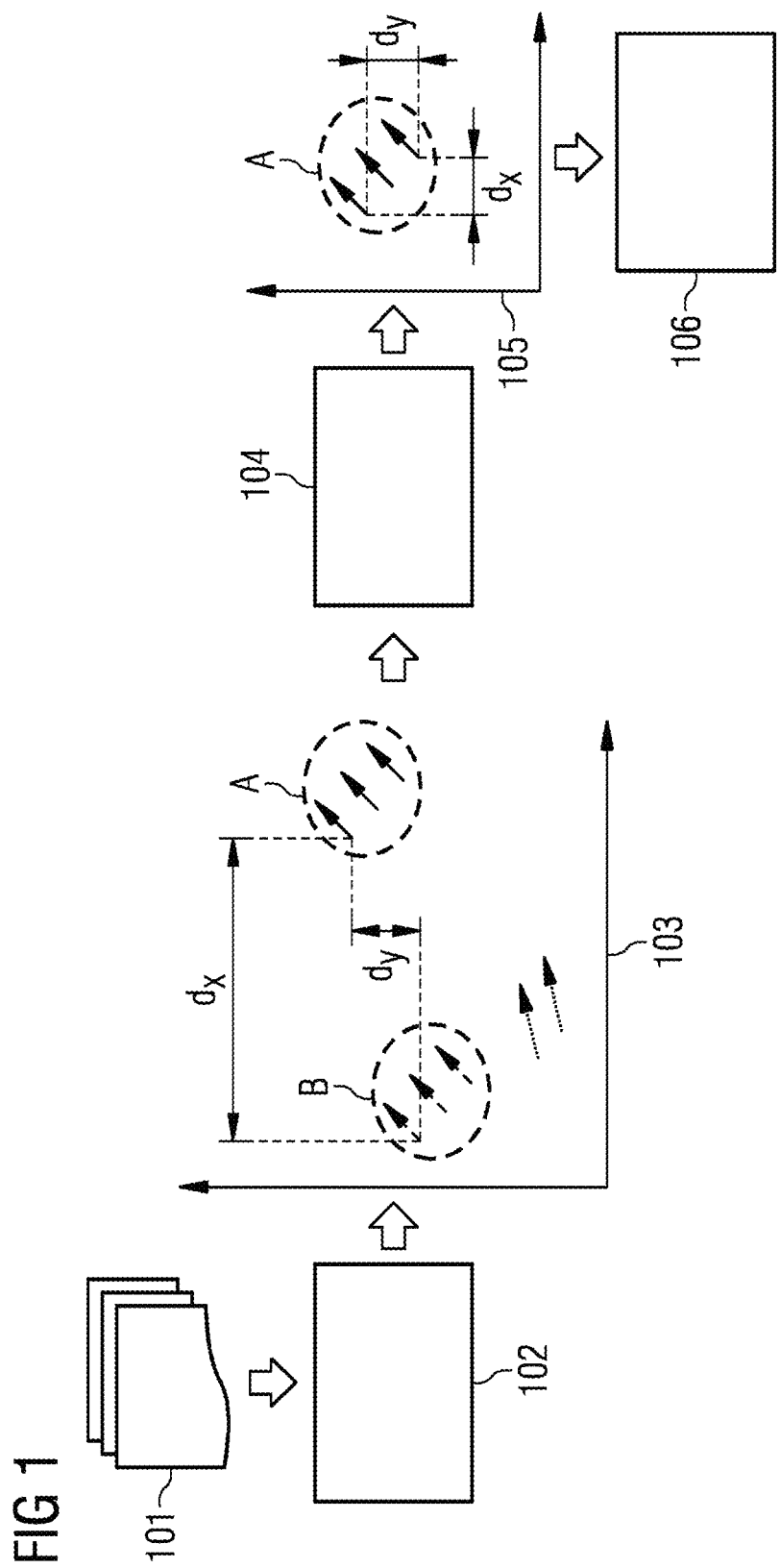
FIG. 1 depicts an example of a method for extracting message templates.

The proposed method includes employing different natural language processing techniques in order to extract templates from computer log files in semi-structured text corpora and may be schematically shown in FIG. 1.

The method includes (as shown in FIG. 1): retrieving the individual messages 101 from the computer log files and storing it in a text corpus 102; transforming a text corpus into a vector space representation 103; calculating a cosine similarity between different messages in a vector space 104; clustering messages based on a distance calculation between similar vectors, 105; and with a given cluster performing additional clustering in order to determine a log message template, 106.

The abovementioned acts are described below in detail. This is only a beneficial example of the disclosure and should not have a restricting effect on the scope of the disclosure.

An Exemplary Individual (Log) Message Might Look Like this:

"The service started successfully"
"The service stopped successfully"

Act 1 Includes Retrieving or Getting Log Messages, 101.

The method starts by parsing a computer file system with a data collector. In this example, the information is collected in a tabular representation, 102. Every log entry in this table includes one single log message itself, 101, and other information that might be useful for further analysis. In this act, all the log messages are collected to obtain a text corpus collection of the individual log messages.

The output of this first act is a (N×L) table where "N" is the number of individual log messages collected, by a data collector, and "L" is a column which contains the log message itself. In this case, the individual log messages have a variable length and might include several words up to hundred words. There might be further columns with additional information.

This table is used further as a so-called text corpus.

Act 2 Includes Transforming the Text Corpus into a Vector Space, 102.

After performing act 1, having the text corpus, it is transformed into a vector space representation, 103.

This may be processed with the known "Count Vectorizer" (https://scikit-learn.org/stable/modules/generated/sklearn.feature_extraction.text.CountVectorizer.html), followed by a term frequency-inverse document frequency (TF-IDF) converter:

At first, all the unique words in a text corpus are counted and the frequency of occurrence of every unique word building the vocabulary.

In the second act, the TF-IDF technique is employed in order to get term frequency times inverse document frequency of a certain word in a text corpus [https://en.wikipedia.org/wiki/Tf-idf].

However, this act may be performed with the usage of any other suitable approach.

The example of a transformation is shown in the table below, exemplarily represented as a python dictionary.

The table shows a list of words out of the data set. On the left side, the words are listed with their number of appearances within the data set. On the right side, the calculated values of TFIDF are shown. As one may see, most of the numbers on the right side are equal. Only the word "priority" appears in more individual messages than the other words and has therefore a smaller number, even if the absolute number of appearances is lower than the expression "server" or "sql".

| Plain count vectorizer | Transformation using TFIDF |
| --- | --- |
| 'sql': 2471, | 'sql': 15.81, |
| 'server': 2328, | 'server': 15.81, |
| 'starting': 2504, | 'starting': 15.81, |
| 'normal': 1808, | 'normal': 15.81, |
| 'priority': 2015, | 'priority': 11.96, |
| 'base': 273, | 'base': 15.81, |
| 'informational': 1389 | 'informational': 15.81 |

As an output of the second act, a text corpus represented in a vector space, 103, is provided. The dimension of this space is N×M, where N is the number of messages in the text corpus and M represents the coordinates of this message in the vector space.

In the example in FIG. 2, two clusters A and B, with the varying distances dx and dy, are identified.

Further messages, not fitting into one of the clusters A or B, are shown under reference C.

Act 3 Includes Calculating Similarities Between Individual Messages.

With a given representation of messages in a vector space, a calculation may be conducted regarding how similar each message is with respect to a reference message.

In order to perform such a similarity calculation, in an advantageous embodiment, a cosine similarity approach is used. In a vector space, this means that vectors are pointing in a similar or same direction. In this act, all messages may be clustered that have nearly the same cosine similarity (i.e., with a threshold of 0.7), but different Euclidian distance and have number of clusters K.

Any other distance measure for the second act may be used, (e.g., Manhattan distance), in which the distance function or metric of Euclidean geometry may be replaced by a new metric in which the distance between two points is the sum of the absolute differences of their Cartesian coordinates).

For Example:

| | |
| --- | --- |
| "The service started successfully" | → [1.7 3   4 10] |
| "The service stopped successfully" | → [1.7 3 20 10] |
| Cosine similarity = 0.8 | |
| "Fault set by user request" | → [2.3 5 7 13 11] |
| "Fault set by system request" | → [2.3 5 7   9 11] |
| Cosine similarity = 0.75 | |

Calculated Euclidian distance between the two clusters=20

Act 4 Includes Extracting a Message Template.

Clusters are detected that represent different message types. The example of individual messages belonging to two different clusters, Cluster A and Cluster B, as already stated in the FIG. 2, 103 is shown in the Table below:

| Cluster A | Cluster B |
| --- | --- |
| The service started successfully | Fault set by user request |
| The service stopped successfully | Fault set by system request |

The individual messages in the two clusters each have one constant and one varying part. In order to extract the constant and varying part in the proposed approach, act 2 and act 3 are repeated for every cluster.

The message template for Cluster A would then be set as: "The service" (variable part) "successfully."

Additionally, the message template for Cluster B is identified as:

"Fault et by" (variable part) "request"

FIG. 2 on the right side shows the result after taking the given cluster A and carrying out calculations of similarity, as described. Value dx is xxx and value dy is yyy.

The advantage of the proposed method and system is the fast clustering of computer log messages according to its context and having the clusters being able to extract constant and varying part of messages belonging to each cluster.

To better understand the specialty of the domain and the limited vocabulary, the cosine similarity for two different data sources is calculated in an example to show the difference and the advantage of the proposed method in the specific domain.

Figure 3:
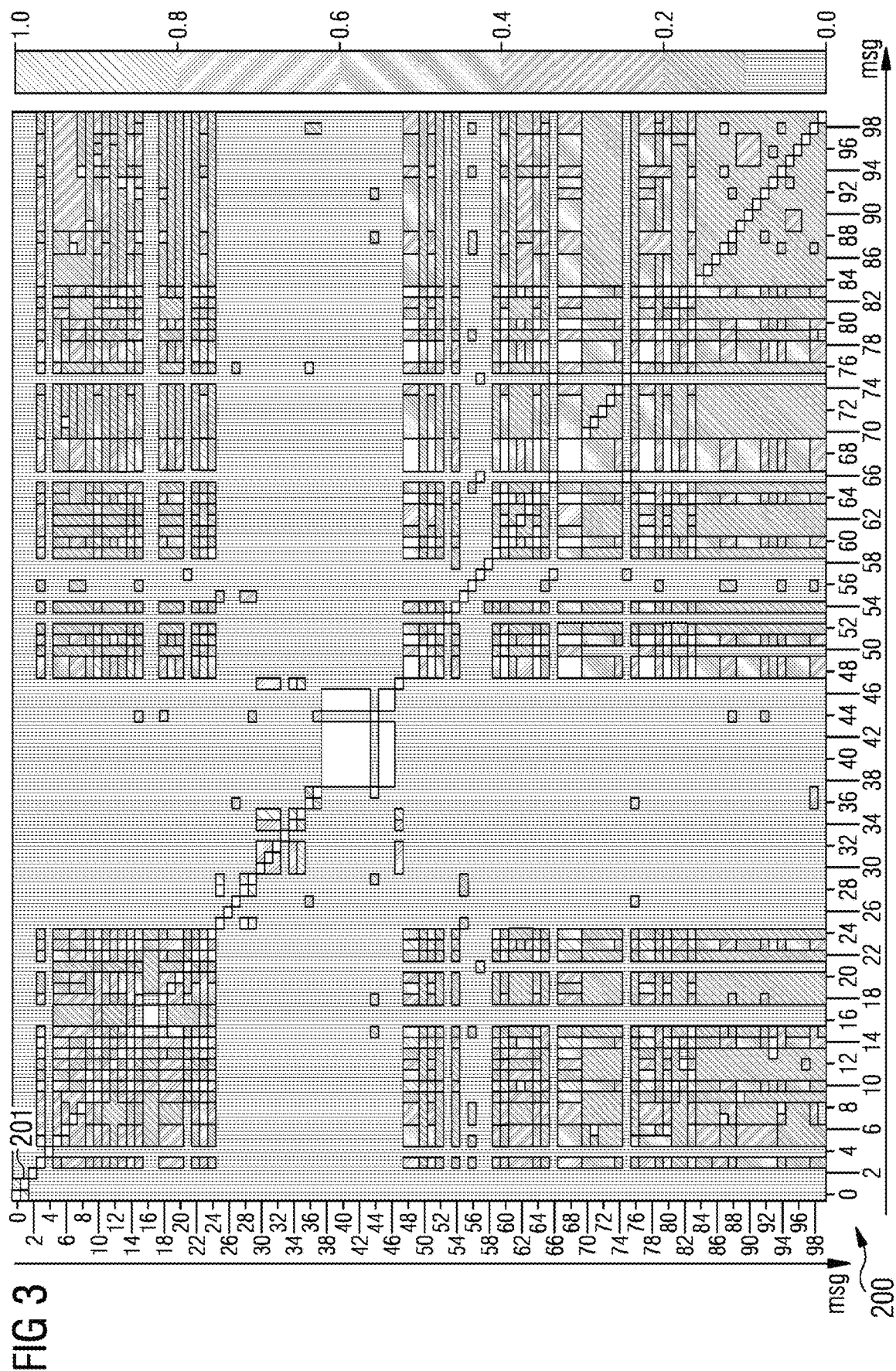
FIG. 3 depicts an example of a cosine similarity of 100 messages out of a data set.
Figure 4:
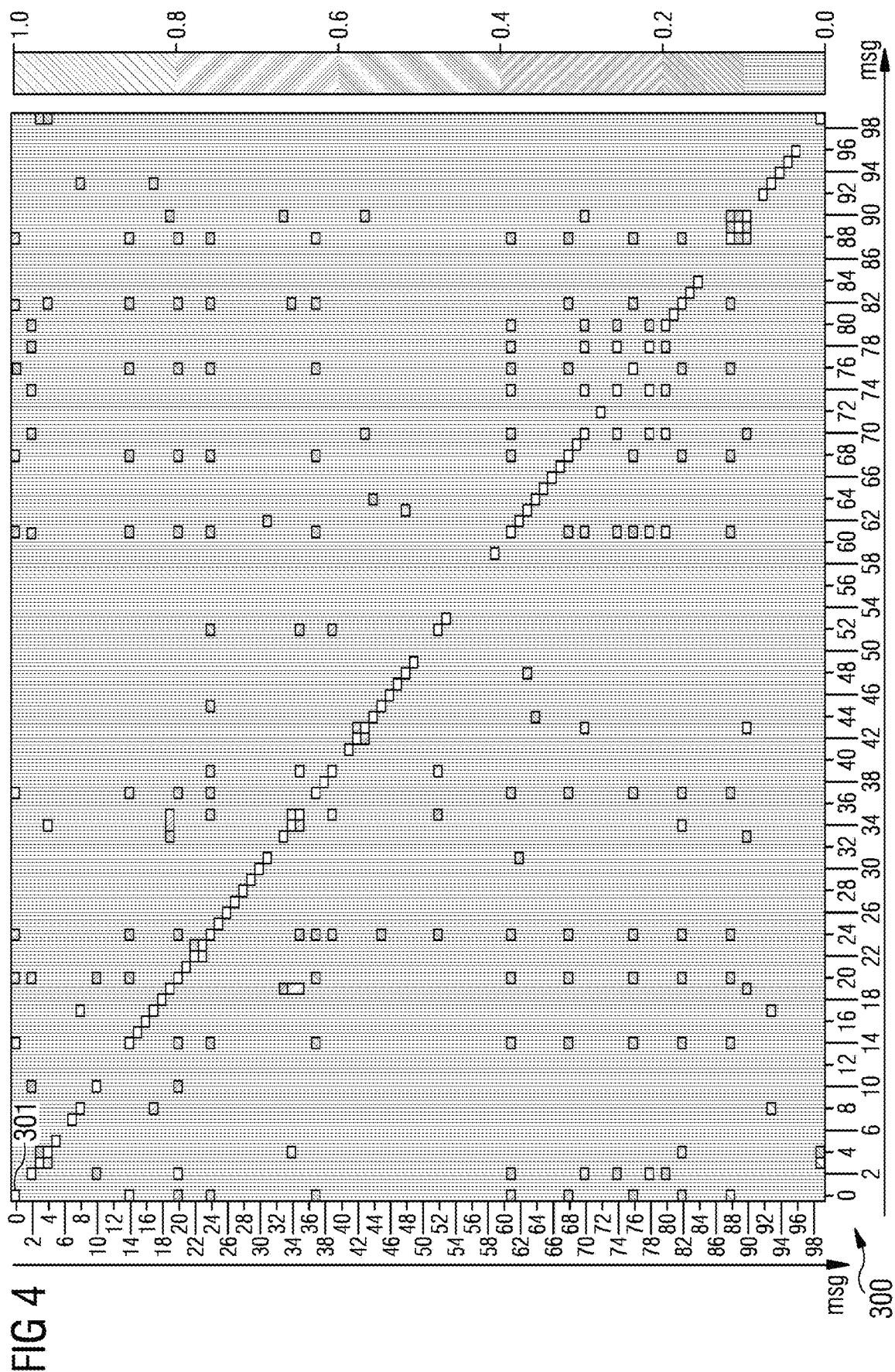
FIG. 4 depicts an example of a cosine similarity of 100 messages out of a randomly selected text, for example, a book.

In FIG. 3, 100 messages from an exemplary data set of log messages are the basis of the calculation, while in FIG. 4, the first 100 lines of a text from literature were taken as a basis.

FIG. 3 shows in a matrix one example based on a log file that contains 100 individual messages, msg. Every line and column (characterized by one number on the x and y axis of the matrix) represents one of that individual messages. How similar each message is in comparison to every other message is shown by the different hatching in the boxes. The value of the similarity is between 0.0 and 1.0, as one may compare the value with that on the bar on the right side of the Matrix. It may clearly be seen that there are repeating patterns (for example rows/columns 48,49 and 67,68 and 77,78) and sequences of identical messages 38,39,40,41, because the cosine similarity is 1 there.

The second example, depicted in FIG. 4, shows a comparable cosine similarity matrix with the first hundred lines of a piece of literature. Also every single message (sentence) has one line and column, marked by a number 0 to 99. The similarity is marked as in FIG. 3, also by similar hatching. As you may see in the matrix of FIG. 4, similar lines of text are rare, only a few may be found, like lines/columns 8 and 17 are close to each other or lines 74 and 78 are similar.

Out of the examples, it may be understood that a log file message dataset is more structured and with a very small set of vocabulary. That is the reason why it is advantageous to combine different NLP techniques to find a valuable solution for the clustering problem.

The proposed Method and System may be used in different applications to cluster textual data out of log files or other semi-structured data sets from various systems. This may as a result lead to an increased system uptime and reduced maintenance costs.

The proposed Method and System supports the operator of a technical appliances by analyzing their computer systems and simplifies the support and maintenance tasks.

The Method and System may be used as a stand-alone application due to its scalability to any computer systems which generate log messages.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

While the present disclosure has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method for analyzing data comprising a plurality of individual messages stored in a computer file in a semi-structured way by containing markers to separate semantic elements, wherein one individual message of the plurality of individual messages corresponds to one log message in an industrial application providing a chronological record, the method comprising:

retrieving, by a computer, the plurality of individual messages from the file and storing the plurality of individual messages in a text corpus in a structured way;

transforming, by the computer, the text corpus into a vector space representation;

calculating a cosine similarity between the plurality of individual messages in a vector space;

clustering, by the computer, the plurality of individual messages, based on a calculation of Eucledian distance between similar vectors to a first clustering, which have a similar cosine similarity, with a threshold of 0.7, but different Euclidian distance;

generating, by the computer, a log message template that identifies sequence patterns representing higher-level events that happen in the industrial application; and providing, by the computer, the log message template in a log file to a user.

2. The method of claim 1, further comprising:
repeating the clustering of the plurality of individual messages in the first clustering at least one time to provide at least one additional clustering.

3. The method of claim 1, wherein the text corpus comprises at least one further column with additional information.

4. The method of claim 1, wherein the calculating of the cosine similarity is performed between different messages in the vector space through Levenshtein distance method or WordNet similarity.

5. The method of claim 1, wherein the transforming of the text corpus comprises use of a term frequency-inverse document frequency converter.

6. The method of claim 1, wherein the method is performed for every cluster repeating the transforming of the text corpus and the calculating of the cosine similarity in order to extract at least one constant and one varying part of a message.

7. The method of claim 1, further comprising:
generating a knowledge base of log messages, corresponding events, and severities of the corresponding events; and
automatically detecting anomalies in log files using the knowledge base.

8. The method of claim 1, wherein the method is performed as a stand-alone application.

9. The method of claim 1, further comprising:
identifying, by the computer, an anomaly in the log file.

10. A non-transitory computer program product that, when executed on a computer, causes the computer to:
retrieve a plurality of individual messages from a file and store the plurality of individual messages in a text corpus in a structured way;
transform the text corpus into a vector space representation;
calculate a cosine similarity between the plurality of individual messages in a vector space;
cluster the plurality of individual messages, based on a calculation of Eucledian distance between similar vectors to a first clustering, which have a similar cosine similarity, with a threshold of 0.7, but different Euclidian distance;
generate a log message template that identifies sequence patterns representing higher-level events that happen in an industrial application; and
provide the log message template in a log file to a user.

* * * * *